(12) United States Patent
Geiger et al.

(10) Patent No.: US 7,609,910 B2
(45) Date of Patent: Oct. 27, 2009

(54) SYSTEM AND METHOD FOR CREATING A PANORAMIC VIEW OF A VOLUMETRIC IMAGE

(75) Inventors: Bernhard Geiger, Cranbury, NJ (US); Sandra Sudarsky, Bedminster, NJ (US); Christophe Chefd'hotel, Princeton, NJ (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 592 days.

(21) Appl. No.: 11/100,177

(22) Filed: Apr. 6, 2005

(65) Prior Publication Data

US 2005/0226483 A1    Oct. 13, 2005

Related U.S. Application Data

(60) Provisional application No. 60/561,183, filed on Apr. 9, 2004.

(51) Int. Cl.
*G06K 9/36* (2006.01)
(52) U.S. Cl. .................... 382/276; 382/128; 348/38
(58) Field of Classification Search ............ 345/419, 345/427, 619, 620; 382/128, 154, 284
See application file for complete search history.

(56) References Cited

U.S. PATENT DOCUMENTS

| | | | | |
|---|---|---|---|---|
| 5,831,623 A * | 11/1998 | Negishi et al. | ............... | 345/424 |
| 5,971,767 A * | 10/1999 | Kaufman et al. | ............ | 434/267 |
| 5,999,187 A * | 12/1999 | Dehmlow et al. | ........... | 345/420 |
| 6,514,082 B2 * | 2/2003 | Kaufman et al. | ............ | 434/262 |
| 6,947,039 B2 * | 9/2005 | Gerritsen et al. | ............ | 345/419 |
| 7,102,634 B2 * | 9/2006 | Kim et al. | ................... | 345/419 |
| 7,123,777 B2 * | 10/2006 | Rondinelli et al. | .......... | 382/284 |
| 7,232,409 B2 * | 6/2007 | Hale et al. | ................... | 600/118 |
| 7,245,761 B2 * | 7/2007 | Swaminathan et al. | ....... | 382/154 |
| 7,269,241 B2 * | 9/2007 | Siltanen et al. | ................ | 378/4 |
| 7,324,104 B1 * | 1/2008 | Bitter et al. | ................. | 345/420 |
| 2002/0190980 A1 | 12/2002 | Gerritsen et al. | | |
| 2003/0152897 A1 * | 8/2003 | Geiger | ....................... | 434/262 |
| 2005/0151730 A1 * | 7/2005 | Lobregt | ...................... | 345/419 |
| 2005/0168616 A1 * | 8/2005 | Rastegar et al. | ............. | 348/335 |
| 2007/0052724 A1 * | 3/2007 | Graham et al. | ............... | 345/620 |

FOREIGN PATENT DOCUMENTS

WO    WO 0055812    *    9/2000

OTHER PUBLICATIONS

Paul Bourke, "Fast 360 degree 3D model exploration technique using 6 precomputed views mapped onto the interior faces of a cube", http://local.wasp.uwa.edu.au/~pbourke/projection/cuberender/, pp. 1-17, Jan. 1991.*

(Continued)

*Primary Examiner*—Samir A Ahmed
*Assistant Examiner*—Mekonen Bekele

(57) ABSTRACT

A system and method for creating a panoramic projection of a volumetric image of an object is disclosed. A virtual camera is placed in a center of a cubic space within the object. Images obtained from the camera are projected onto a single plane. A front image is mapped in a window at a center of the plane. A left, right, top and bottom image of the cubic space are mapped around the rectangular window such that the left, right, top and bottom images form a continuous image surrounding the rectangular window.

16 Claims, 6 Drawing Sheets

OTHER PUBLICATIONS

Scott Vallance and Paul Calder, "Multi-Perspective Images for Visualisation" Australian Computer Society, Inc. This paperappeared at the Pan-Sydney Area Workshop on Visual Information Processing (VIP2001), Sydney, Australia. Conferences in Research and Practice in Information Technology, vol. 11, pp. 1-8, 2002.*

Ulf Tiede, Norman von Sternberg-Gospos,Paul Steiner,and Karl Heinz Hohne "Virtual Endoscopy Using Cubic QuickTime-VR Panorama Views" MICCAI 2002, LNCS 2489, pp. 186-192, 2002, Springer-Verlag Berlin Heidelberg 2002.*

Ming Wan, Qingyu Tang, Arie Kaufman, Zhengrong Liangy, and MarkWaxz; "Volume Rendering Based Interactive Navigation within the Human Colon";Center for Visual Computing (CVC)and Departments of Computer Science and Radiology, State University of New York at Stony Brook, Stony Brook,, p. 397-400, 1999 IEEE.*

Anna Vilanova Bartroli, Rainer Wegenkitt Andreas Konig, Eduard Groller,"Nonlinear Virtual Colon Unfolding", Institute of Computer Graphics and Algorithms Vienna University of Technology, pp. 411-579,IEEE Visualization,2001.*

Dongho Kim and James K. Hahn, "Projective Texture Mapping with Full Panorama", Eurographics 2002 / G. Drettakis and H.-P. Seidel vol. 21 (2002), No. 3, pp. 421-430.*

Ulf Tiede, Norman von Sternberg-Gospos,Paul Steiner, and Karl Heinz Hohne "Virtual Endoscopy Using Cubic QuickTime-VR Panorama Views" MICCAI 2002, LNCS 2489, pp. 186-192, 2002, Springer-Verlag Berlin Heidelberg 2002.*

Paul Bourke, "Fast 360 degree 3D model exploration technique using 6 precomputed views mapped onto the interior faces of a cube", http://local.wasp.uwa.edu.au/-pbourke/projection/cuberender/, pp. 1-17, Jan. 1999.*

Anna Vilanova Bartroli, Rainer Wegenkitt Andreas Konig, Eduard Groller,"Nonlinear Virtual Colon Unfolding", Institute of Computer Graphics and Algorithms Vienna University of Technology, pp. 411-579,1EEE Visualization,2001.*

M. Sabry Hassouna, A.A. Farag, and Robert Falk "Virtual Fly-Over: A New Visualization Technique for Virtual Colonoscopy" R. Larsen, M. Nielsen, and J. Sporring (Eds.): MICCAI 2006, LNCS 4190, pp. 381-388, 2006.*

Huang et al., "Teniae Ciol Guided Navigation and Regestration for Virtual Colonoscopy", IEEE visualization 2005, Oct. 23-28, pp. 279-285.*

Serlie et al., "Improved Visualization in Virtual Colonoscopy Using Image-Based Rendering", Data Visualization 2001, Proceedings of the Joint Eurographics and IEEE TCVG Symposium on Visualization, May 2001, pp. 137-146.

Paik et al., "Visualization Modes for CT Colonography Using Cylindrical and Planar Map Projections", J Comput Assist Tomogr 24, 2000, pp. 179-188.

Wan et al., "Automatic centerline extraction for virtual colonoscopy", IEEE Transactions on Medical Imaging, vol. 21, No. 12, Dec. 2002, pp. 1450-1460.

Wan et al., "Distance-Field Based Skeletons for Virtual Navigation", Visualization 2001, San Diego, CA, Oct. 2001, pp. 239-245.

Wax et al., "Endoscopic View in Virtual Colonoscopy: Achieving Complete Surface Visualization", RSNA, http://www.viatronix.net/med_com_VisSurf-final.asp.

Bartoll et al., "Virtual Colon Unfolding", IEEE Visualization 2001.

Bourke P, "Fast 360 Degree 3D Model Exploration Technique Using 6 Precomputed Views Mapped Onto the Interior Faces of a Cube", astronomy.swin.edu.au, Jan. 1991, pp. 1-11.

Tiede U et al, "Virtual Endoscopy Using Cubic QuickTime-VR Panorama Views", *Medical Image Computing and Computer-Assisted Intervention-MICCAI 2002*, 5th International Conference Proceedings, Part II (Lecture Notes in Computer Science vol. 2489), Springer-Verlag, Berlin, Germany, 2002, pp. 186-192.

Vallance S et al, "Multi-Perspective Images for Visualisation", Pan-Sydney Area Workshop on Visual Information Processing VIP2001, 'Online! 2002, pp. 1-8, Retrieved from the Internet: URL: http://crpit.com/confpapers/crpitv11va Ilance.pdf, retrieved on Jul. 23, 2005! p. 6-7, figure 11.

Wegenkittl R et al, "Mastering Interactive Virtual Bronchioscopy on a Low-End PC", *Proceedings Visualization 2000*, Salt Lake City, UT, Oct. 8-13, 2000, Annual IEEE Conference on Visualization, Los Alamitos, CA, IEEE Computer Society, US Oct. 8, 2000, pp. 461-464.

Paik D S et al, "Visualization Modes for CT Colonography Using Cylindrical and Planar Map Projections", *Journal of Computer Assisted Tomography*, New York, NY, US, vol. 24, No. 2, 2000, pp. 179-188.

International Search Report including Notification of Transmittal of the International Search Report, International Search Report, and Written Opinion of the International Searching Authority, Aug. 24, 2005, 12 pages.

* cited by examiner

SYSTEM AND METHOD FOR CREATING A PANORAMIC VIEW OF A VOLUMETRIC IMAGE

CROSS REFERENCE TO RELATED APPLICATION

This application claims the benefit of U.S. Provisional Patent Application Ser. No. 60/561,183, filed on Apr. 9, 2004, which is incorporated by reference in its entirety.

FIELD OF THE INVENTION

The present invention is directed to a system and method for creating a panoramic view of a volumetric image, and more particularly, to a system and method for creating a three dimensional panoramic display of a volumetric image of an object such as a colon.

BACKGROUND OF THE INVENTION

Virtual endoscopy is a non-invasive diagnostic procedure aimed at exploring the inner surface of anatomical structures inside the human body. Using advanced image-processing techniques, three dimensional (3D) models are reconstructed from a series of high-resolution two dimensional (2D) images. A physician can then navigate inside the 3D virtual model either manually or using an automatic navigation algorithm.

One of the most promising uses for virtual endoscopy is the screening of patients for colorectal cancer. Virtual endoscopy mimics conventional colonoscopy with the added advantage that it is less invasive and potentially more attractive as a screening method. An additional benefit of virtual colonoscopy over conventional colonoscopy is the ability to fly-through the colon in both an antegrade and retrograde direction. Although this dual directional navigation significantly increases the amount of surface displayed, substantial sections of the colon remain obstructed behind haustral folds.

A number of techniques have been proposed to create image projections that overcome some of the limitations of the standard 3D visualization technique. These techniques seek to display more of the surface of the colon and thereby increase the polyp detection sensitivity. Some of the views are generated by placing the virtual camera in the center of a viewing space, and projecting images onto the corresponding walls.

One known technique uses a cubic viewing space with the cameras located in the center of the cube and projecting on each face an image with a 90 degree viewing angle. The cube is then unfolded into a single plane presenting a 360 degree field of view of the colon surface. An example of this projection is shown in FIG. 1. To reduce the disturbance due to the discontinuities that arise with this representation, small images are added as flaps adjacent to each face. Off-line animated image sequences are generated from a number of point samples selected along the central path through the colon. FIG. 1 shows a single frame of an animated sequence using this cubing mapping. Each square shown in FIG. 1 represents a different side of the cube. As shown, the sides are labeled as left 102, bottom 104, front 106, top 108, right 110 and back 112. The unfolded cube forms a cross-like structure. While this technique shows a projection of multiple views in the same frame, the construction of the layout is difficult to follow and has black areas which disrupt the viewing area. As a result, a polyp that appears near an edge of the cube can be split into two or more windows when the cube is unfolded.

Another known technique uses map projections that visualize the entire surface of a viewing sphere. Using Mercator and stereographic projections, the surface of the sphere is transformed onto a flat surface. The major drawback of this technique is that, as any projection of the surface of a sphere on a plane, it introduces some degree of deformation of the image. In particular, the Mercator projection maps the poles of the globe infinitely far away while displaying the objects near the equator with minimum distortion. There is a need for a method for creating a panoramic endoscopic view from a volumetric image that efficiently displays the views and is minimally distorted.

SUMMARY OF THE INVENTION

The present invention is directed to a system and method for creating a panoramic projection of a volumetric image of an object. A virtual camera is placed in a center of a cubic space within the object. Images obtained from the camera are projected onto a single plane. A front image is mapped in a window at a center of the plane. A left, right, top and bottom image of the cubic space are mapped around the rectangular window such that the left, right, top and bottom images form a continuous image surrounding the rectangular window.

BRIEF DESCRIPTION OF THE DRAWINGS

Preferred embodiments of the present invention will be described below in more detail, wherein like reference numerals indicate like elements, with reference to the accompanying drawings.

DETAILED DESCRIPTION

The present invention is directed to a system and method for creating a panoramic endoscopic view from a volumetric image of an object. The present invention will be described in the context of performing a medical examination of a patient using a medical imaging system. More particularly, the present invention will be described in the context of using a Computed Tomography (CT) system to perform a virtual colonoscopy.

It is to be understood by those skilled in the art that the present invention may be used with any type of two or three dimensional imaging system for the purpose of viewing the internal structure of a patient. Such structures may include organs, blood vessels, tissue areas or other defined structures. The patient may be a human or an animal. Furthermore, the approach may be applied to images of any dimension since the filter is defined for higher dimensions as well as 2D.

The present invention may also be used in non-medical applications that involve two or three dimensional imaging. One such example could be for security screening to determine the contents or packages or otherwise contained objects. Such a system could be used in a postal delivery environment or for screening belongings in an airport or other high security venue. The present invention could also have industrial applications and be used to inspect or count items being manufactured or assembled.

The present invention utilizes a panoramic projection of a volumetric image of an object so that an observer, such as a physician or medical technician can view the maximal amount of surface without obstruction and in a way that it appears as if the observer is truly inside the object being viewed. The panoramic projection is designed to increase surface visibilities during virtual endoscopies. The present invention creates a projection that renders five faces of a cubic viewing space into a plane in a continuous fashion. Using this type of visualization technique as a screening method for colon cancer could significantly reduce the evaluation time as it avoids having to fly-through the colon in both directions and prevents the occlusion of potential polyps behind haustral folds.

Figure 2:
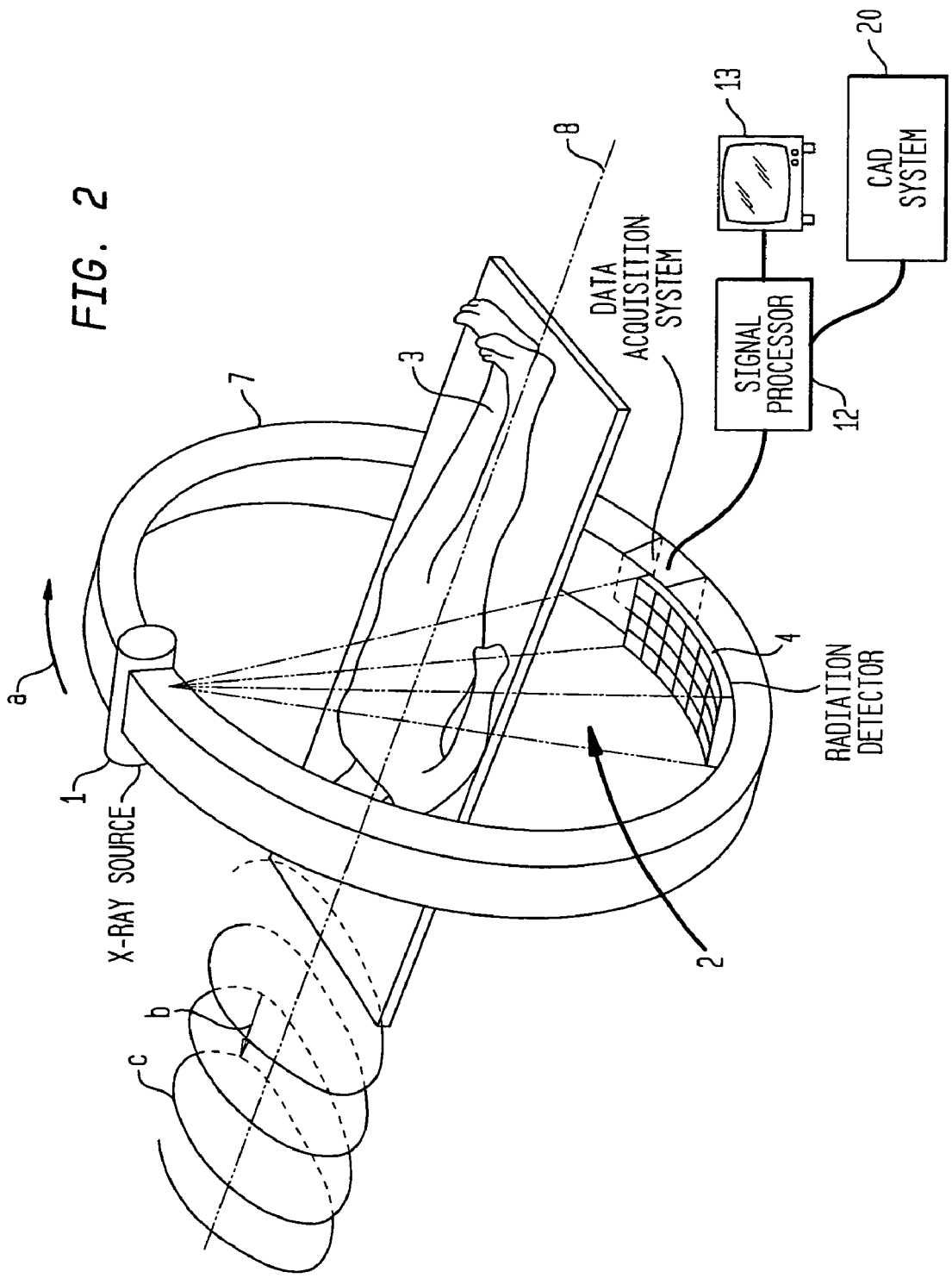
FIG. 2 is a system block diagram of a system for creating a panoramic view from a volumetric image of a colon in accordance with the present invention.

FIG. 2 schematically depicts an exemplary CT system in accordance with the present invention. The CT system in conjunction with a Computed Aided Detection (CAD) system can be used to perform a non-invasive procedure on a patient to screen for various medical conditions. Examples of such procedures are virtual colonoscopies or chest screenings for the presence of lesions and possibly cancerous tissue. It is to be understood by those skilled in the art that other imaging modalities can be used without departing from the scope and spirit of the present invention. For example, magnetic resonance imaging (MRI), fluoroscopy or ultrasound imaging could also be used to obtain the imagines. For purposes of explanation, the present invention will be described in the context of use of a CT system.

The CT system is equipped with an X-ray source 1, emitting a pyramidal X-ray beam 2, whose marginal rays are represented by the dot-dashed lines in FIG. 2 that penetrates an object 3 to be examined, for example, a patient, and that is incident on a radiation detector 4. The X-ray source 1 and the radiation detector 4 are, in the exemplary embodiment, mounted opposite to one another on an annular gantry 7.

The X-ray source 1 and the radiation detector 4 thus form a metrological system that can be rotated around the system axis 8 so that the patient 3 can be X-rayed at various projection angles relative to said system axis 8 and at various positions along the system axis 8. The resultant output signals of the individual detector elements are read out by a data acquisition system 10. The signals are sent to a signal processor 12 that computes an image of the patient 3 that, in turn, can be displayed on a monitor 13.

The images scanned by the CT system and computed by the signal processor 12 are transmitted to a CAD system 20 for further processing. The CAD system 20 applies a filter to the image to obtain a response image. This is then used to generate candidates. Features are then collected from the candidates (including features derived from the filter values) and used to classify them as true or false positives. Only the candidates classified as true positives are presented to the physician.

Figure 3:
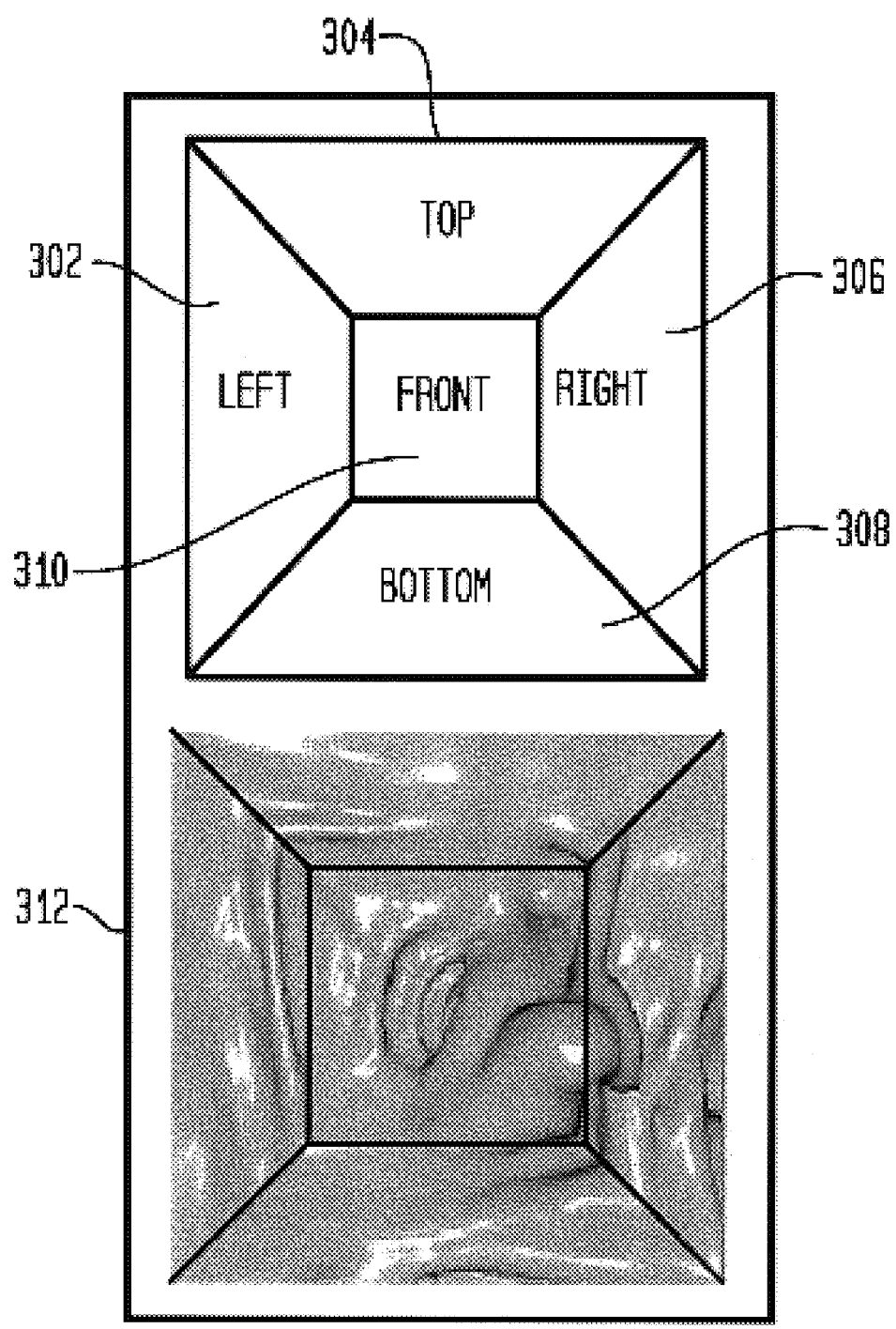
FIG. 3 illustrates a panoramic projection of an image of a colon in accordance with the present invention.

In accordance with the present invention, a cubic viewing space in used in which the back projection is not displayed. A virtual camera is placed in the center of a cubic space and images are projected into a single plane using a 90 degree viewing angle. In accordance with the present invention, the front image is mapped into a rectangular window at the center of the plane while the other four images are projected into trapezoidal shaped windows as illustrated in FIG. 3. This approach resolves the problem of discontinuity found in the prior art (see FIG. 1) and at the same time makes better use of the screen space. As can be seen in FIG. 3, the center of the image 310 is the central view of the camera. Surrounding this view is the left view 302, top view 304, right view 306 and bottom view 308. The arrangement of the views provides a more realistic perspective of being inside the colon.

Figure 4:
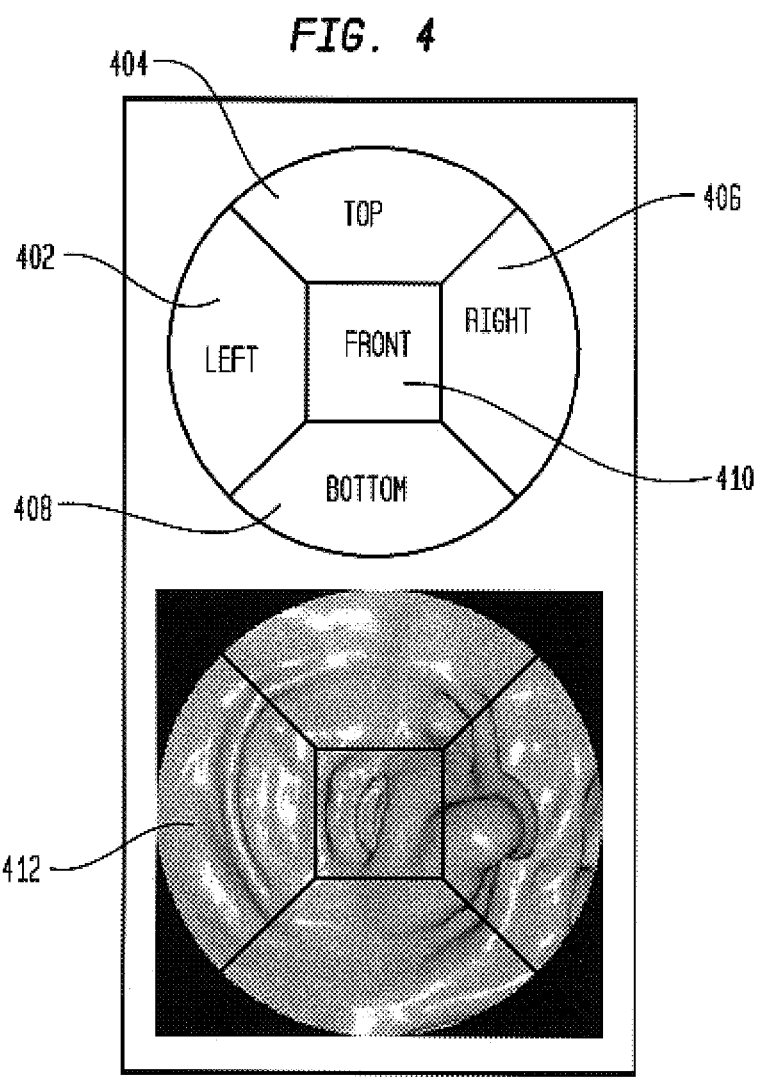
FIG. 4 illustrates a panoramic projection of an image of a colon~in accordance with another embodiment of the present invention.

A fast raycast algorithm is used to render each frame in real time. Image 312 is a single frame during a fly-through sequence. The only distortion introduced by the projection arises from the mapping from the cubic walls into the trapezoidal projections. In order to limit the distortions that appear at the edges of the unfolded cube, in accordance with another embodiment of the present invention, another projection can be used. FIG. 4 illustrates a panoramic view in which the front face 410 is mapped into a square and the other four faces 402-408 are mapped around it into a disk. The projection guarantees a smooth transition around the five faces. The size of the frontal view can be adjusted.

A method for creating a panoramic projection from a volumetric image will now be described in more detail with reference to FIGS. 5-7. As shown, the axes of the image coordinate system are labeled x, y and z. The x axis extends from the right to the left of the image. The y axis extends from the bottom to the top of the image. The z axis extends from the back to the front of the image. The panoramic endoscopic view is obtained by casting rays from the center of a virtual endoscope positioned inside the volume. The intensity of a point in the endoscopic view is an arbitrary function of the volume intensity values along the corresponding ray.

From a given endoscopic position, each ray is uniquely characterized by a direction vector. As such, a panoramic view is modeled as a vector field (i.e., a collection of direction vectors). The vector field is computed for a fixed endoscopic position. It is assumed that the endoscope is placed at the origin of the volume coordinate system and points in the z direction. Arbitrary location and orientation of the endoscope can be taken into account by translation and rotation of the vector field.

The two panoramic views described above (i.e., the disc and square view) are improvements of the prior art unfolded cubic view. These panoramic views are designed to obtain a continuous projection, a large field of view and limited distortion.

In accordance with the present invention, the projection is a two step process. First, for each point in the panoramic view, the corresponding point in one of the faces of the unfolded cube is found. Second the corresponding direction vector is found.

Figure 5:
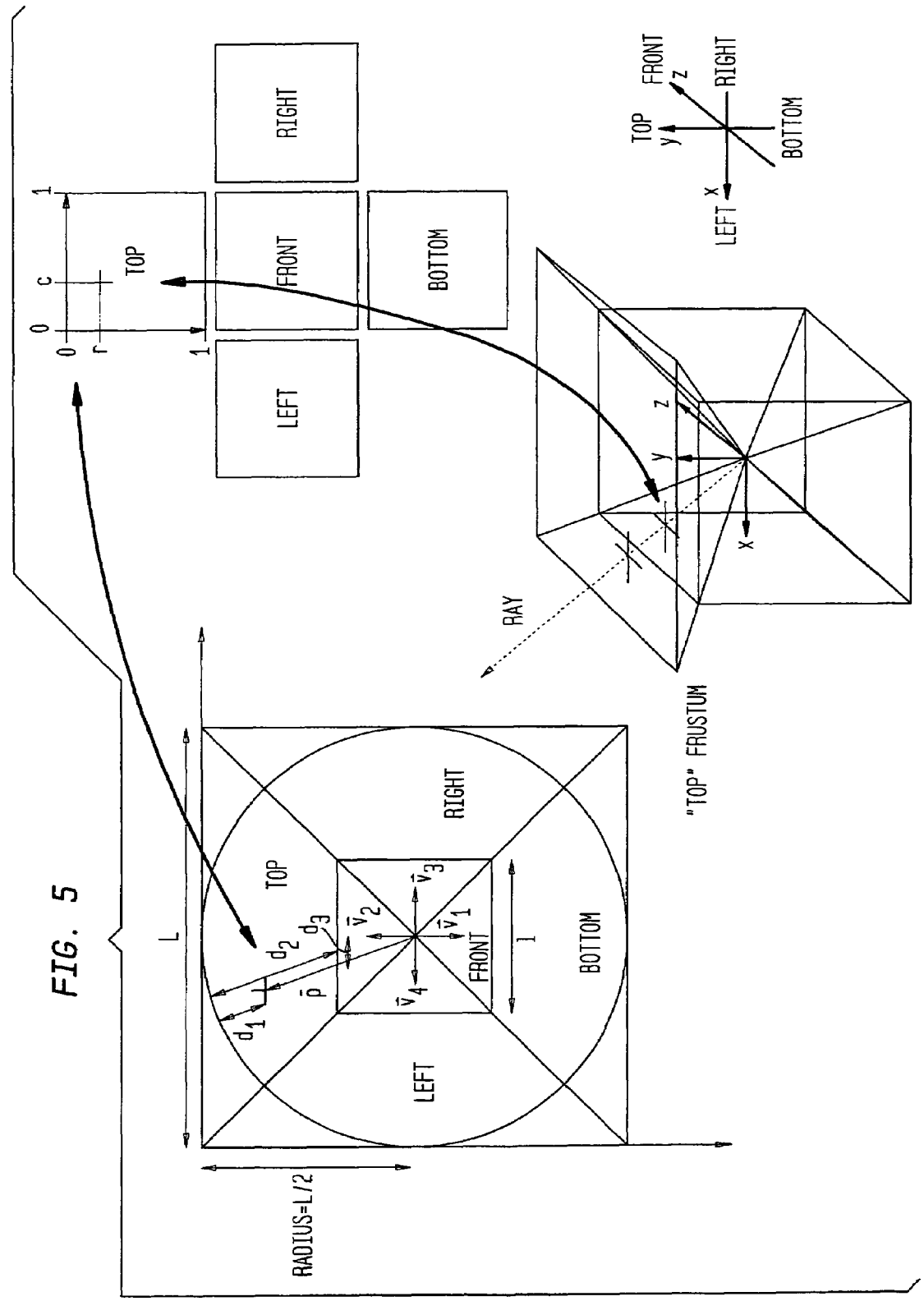
FIG. 5 illustrates a method for creating a disc-shaped panoramic view from a volumetric image in accordance with the present invention.

FIG. 5 illustrates a method for the continuous panoramic projection of an unfolded cube onto a disc in accordance with the present invention. The endoscopic view is modeled as a disc inscribed in a square of side length L (i.e., the disc has a radius equal to L/2). Any point inside this square is characterized by a position vector $\vec{p}$ with respect to its center. The inner square of side length 1 corresponds to the front view of the unfolded cube. The remaining sections of the disc contain transformed versions of the top, left, right and bottom views of the unfolded cube.

Four vectors are introduced: $\vec{v}_1$, $\vec{v}_2$, $\vec{v}_3$, $\vec{v}_4$ as shown in FIG. 5. The term v(j) is denoted as the j-th component of a vector $\vec{v}$ and $\|\vec{v}\|$ its norm. The expression |x| denotes the absolute value of a scalar x. The operator · corresponds to the scalar product of two vectors.

A coordinate system is attached to each face of the unfolded cube (where (0,0) is the upper-left corner of a face and the side length is 1). On a given face, points are located by a set of coordinates (r,c) as shown in FIG. 5. The mapping between the disc and the cube's faces is as follows:

---

If $\|\vec{p}\|$ > radius then set point intensity value to zero (the point is outside the disk)
Else If $\max(|p(1)|, |p(2)|) < \frac{1}{2}$ then (The point is in the inner square – "front" view)
    (What are the corresponding coordinates?)

$$r = 0.5 + \frac{p(1)}{1}$$
$$c = 0.5 + \frac{p(2)}{1}$$

Else
    (The point is in a lateral view)
    (Which view?)

$$\vec{n} = \frac{\vec{p}}{\|\vec{p}\|}$$

If $\vec{n} \cdot \vec{v}_2 > \frac{\sqrt{2}}{2}$ then (The point is in the "top" view)
    cos_angle = $\vec{n} \cdot \vec{v}_2$ (Cosine of the angle between $\vec{p}$ and $\vec{v}_2$)

$$\text{norm\_p\_inside\_front} = \frac{1}{2 \cdot \text{cos\_angle}}$$

Figure 1:
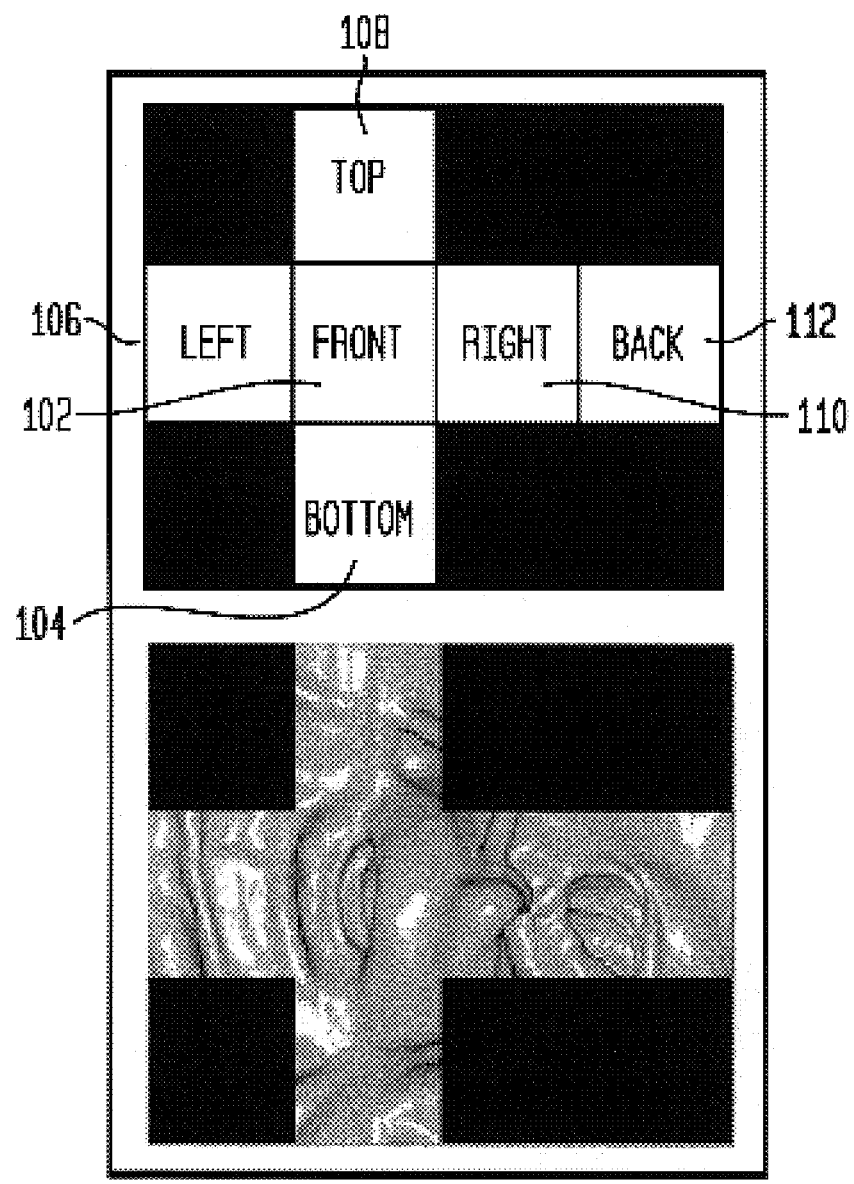
FIG. 1 illustrates a prior art technique for creating a projection of an image of a colon.

(Length of the section of $\vec{p}$ located inside the inner square)

$$r = \frac{\text{radius} - \|\vec{p}\|}{\text{radius} - \text{norm\_p\_inside\_front}} \left( = \frac{d_1}{d_2} \text{ see FIG. 1} \right)$$
$$c = 0.5 + \frac{n(2)}{2 \cdot \text{cos\_angle}} \left( \frac{d_3}{1} = \left| \frac{n(2)}{2 \cdot \text{cos\_angle}} \right| \text{ see FIG. 1} \right)$$

Else If $\vec{n} \cdot \vec{v}_3 > \frac{\sqrt{2}}{2}$ then (The point is in the "right" view)
    [...] (Apply same principle to the new direction)

Else If $\vec{n} \cdot \vec{v}_4 > \frac{\sqrt{2}}{2}$ then (The point is in the "left" view)
    [...] (Apply same principle to the new direction)

Else If $\vec{n} \cdot \vec{v}_1 > \frac{\sqrt{2}}{2}$ then (The point is in the "bottom" view)
    [...] (Apply same principle to the new direction)
    End
    End
End

---

Figure 6:
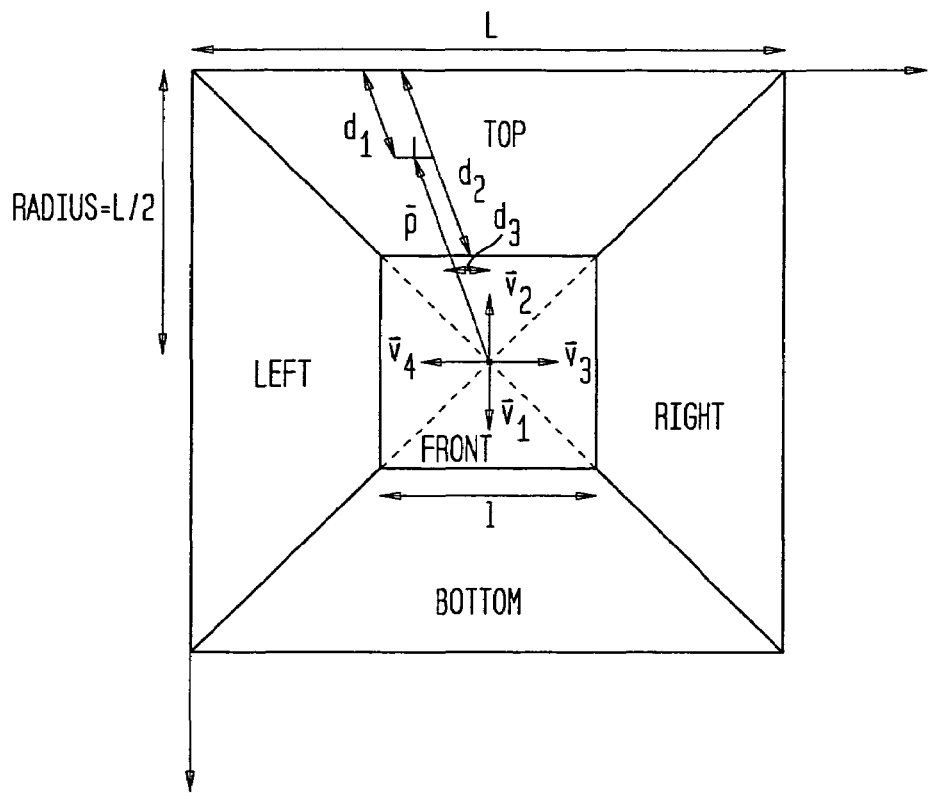
FIG. 6 illustrates a square-shaped panoramic view in accordance with the present invention.

FIG. 6 illustrates a method for the continuous panoramic projection of an unfolded cube onto a square in accordance with the present invention. The square projection view is a variant of the disc projection view, where the unfolded cube is mapped onto a square. There is no regions left unused, but there is some distortion along the diagonals of the endoscopic view. The mapping between the square and the cube's faces is as follows:

---

If $\max(|p(1)|, |p(2)|) < \frac{1}{2}$ then (The point is in the inner square – "front" view)
    (What are the corresponding coordinates?)

$$r = 0.5 + \frac{p(1)}{1}$$
$$c = 0.5 + \frac{p(2)}{1}$$

Else
    (The point is in a lateral view)
    (Which view?)

$$\vec{n} = \frac{\vec{p}}{\|\vec{p}\|}$$

If $\vec{n} \cdot \vec{v}_2 > \frac{\sqrt{2}}{2}$ then (The point is in the "top" view)
    cos_angle = $\vec{n} \cdot \vec{v}_2$ (Cosine of the angle between $\vec{p}$ and $\vec{v}_2$)

$$\text{norm\_p\_inside\_front} = \frac{1}{2 \cdot \text{cos\_angle}}$$

(Length of the section of $\vec{p}$ located inside the inner square)

$$r = \frac{\text{radius}/\text{cos\_angle} - \|\vec{p}\|}{\text{radius}/\text{cos\_angle} - \text{norm\_p\_inside\_front}} \left( = \frac{d_1}{d_2} \text{ see FIG. 2} \right)$$
$$c = 0.5 + \frac{n(2)}{2 \cdot \text{cos\_angle}} \left( \frac{d_3}{1} = \left| \frac{n(2)}{2 \cdot \text{cos\_angle}} \right| \text{ see FIG. 2} \right)$$

Else If $\vec{n} \cdot \vec{v}_3 > \frac{\sqrt{2}}{2}$ then (The point is in the "right" view)
    [...] (Apply same principle to the new direction)

Else If $\vec{n} \cdot \vec{v}_4 > \frac{\sqrt{2}}{2}$ then (The point is in the "left" view)
    [...] (Apply same principle to the new direction)

-continued $$\text{Else If } \vec{n} \cdot \vec{v}_1 > \frac{\sqrt{2}}{2} \text{ then}$$

Figure 7:
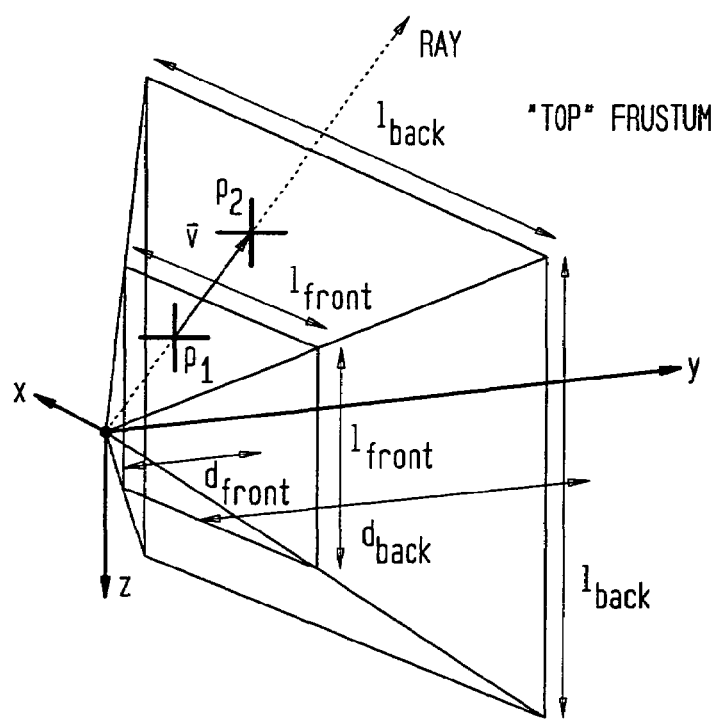
FIG. 7 illustrates a method for finding direction vectors from unfolded cube coordinates in accordance with the present invention.

(The point is in the "bottom" view)
[...] (Apply same principle to the new direction)
    End
End The following explanations refer to FIG. 7 which shows a method for finding direction vectors from the unfolded cube coordinates. To each face of the unfolded cube corresponds a frustum (see FIG. 5 and FIG. 7). A frustum is characterized by a front plane (a square of edge length $l_{front}$ placed at distance $d_{front}$ of the endoscope location) and a back plane (a square of edge length $l_{back}$ placed at distance $d_{back}$ of the endoscope location).

The following describes how to find the direction vector $\vec{v}$ of the ray corresponding to the location (r,c) on one of the cube faces. The "top" view is used as an example; the adaptation to the other views is immediate.

$$\text{Let } p_1 = \begin{bmatrix} \frac{l_{front}}{2} - c \cdot l_{front} \\ d_{front} \\ -\frac{l_{front}}{2} + r \cdot l_{front} \end{bmatrix} \text{ (See FIG. 3)}$$

$$\text{And } p_2 = \begin{bmatrix} \frac{l_{back}}{2} - c \cdot l_{back} \\ d_{back} \\ -\frac{l_{back}}{2} + r \cdot l_{back} \end{bmatrix} \text{ (See FIG. 3)}$$

$$\text{Then } \vec{v} = p_2 - p_1$$

It is to be understood that the methods presented above can be combined to obtain a more compact and efficient implementation. The symmetry of the vector field can also be exploited to reduce the computational cost.

Figure 8:
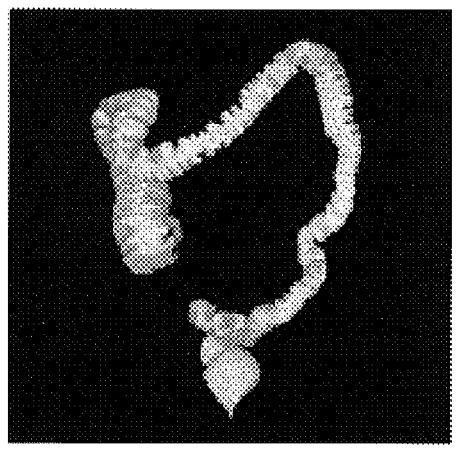
FIG. 8 illustrates an image of a colon and unseen areas after a retrograde fly through using standard camera projection.

To demonstrate the usefulness of the present invention, the percentage of colon surface visualized using the standard camera projection is compared to the colon surface visualized using the panoramic projection of the present invention. A single flight through the virtual colon is performed for each projection. FIG. 8 illustrates a global view of the colon after a fly through in the retrograde direction using the conventional virtual camera projection. The dark gray voxels represent the areas not visible.

Figure 9:
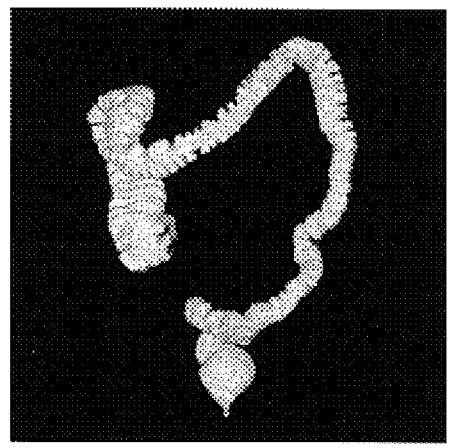
FIG. 9 illustrates an image of a colon and unseen areas after a retrograde fly through using the panoramic projection of the present invention.

FIG. 9 illustrates the results of the same flight using the panoramic projection of the present invention. Since these projections show simultaneously a forward, left, right, up and down view, there is nearly 100% surfactant coverage with one single pass.

To achieve a good coverage, a conventional virtual navigation typically executes the additional fly through in the other direction. The added fly through not only increments the reading time as some parts of the surface are examined twice, but even then some areas remain hidden behind haustral folds. The panoramic projection therefore could be used to speed up the 3D reading since the number of fly throughs can be cut in half. It is to be understood by those skilled in the art that the panoramic projection of the present invention is not limited to the examination of the colon and can be used to display the inner surface of any virtual organ.

Having described embodiments for a method for creating a panoramic projection of a volumetric image, it is noted that modifications and variations can be made by persons skilled in the art in light of the above teachings. It is therefore to be understood that changes may be made in the particular embodiments of the invention disclosed which are within the scope and spirit of the invention as defined by the appended claims. Having thus described the invention with the details and particularity required by the patent laws, what is claimed and desired protected by Letters Patent is set forth in the appended claims.

We claim:

1. A method for performing a virtual fly-through inside of an anatomical lumen, represented by medical image data, using a medical image processing system, comprising:
    placing a virtual camera within the lumen;
    obtaining five images of the interior of the lumen from the point of view of the virtual camera, at 90° viewing angles, the five images comprising a forward image, a left image, a right image, a top image and a bottom image;
    displaying a first virtual fly-through frame by mapping the forward image to a rectangular window at the center of the frame while the remaining four images are projected to windows to the left, right, top, and bottom of the rectangular window, respectively; and
    repeating steps of advancing the position of the virtual camera down the lumen and displaying a subsequent virtual fly-through frame in the manner in which the first virtual fly-through frame was displayed until the virtual fly-through is completed.

2. The method of claim 1, wherein he remaining four images are projected to trapezoidal shaped windows such that all five display windows form a continuous panoramic view in the shape of a rectangle.

3. The method of claim 1, wherein the remaining four images are projected to windows such that all five display windows form a continuous panoramic view in the shape of a disc.

4. The method of claim 1, wherein a fast raycasting technique is used to obtain the five images of the interior of the lumen from the point of view of the virtual camera.

5. The method of claim 1, wherein a size of the forward image can be adjusted.

6. The method of claim 1, wherein the anatomical lumen is a human organ.

7. The method of claim 6, wherein the human organ is a colon.

8. The method of claim 1, wherein the medical image data is obtained using a Computed Tomography system.

9. A system for performing a virtual fly-through inside of an anatomical lumen, represented by medical image data, comprising:
    an image acquisition apparatus for acquiring the medical image data; and
    an image processing system for:
        receiving the acquired medical image data;
        placing a virtual camera within the lumen;
        obtaining five images of the interior of the lumen from the point of view of the virtual camera, at 90° viewing angles, the five images comprising a forward image, a left image, a right image, a top image and a bottom image;
        displaying a first virtual fly-through frame by mapping the forward image to a rectangular window at the center of the frame while the remaining four images are projected to windows to the left, right, top, and bottom of the rectangular window, respectively; and repeating steps of advancing the position of the virtual camera down the lumen and displaying a subsequent virtual fly-through frame in the manner in which the first virtual fly-through frame was displayed until the virtual fly-through is completed.

10. The system of claim 9, wherein the remaining four images are projected to trapezoidal shaped windows such that all five display windows form a continuous panoramic view in the shape of a rectangle.

11. The system of claim 9, wherein the remaining four images are projected to windows such that all five display windows form a continuous panoramic view in the shape of a disc.

12. The system of claim 9, wherein a fast raycasting technique is used to obtain the five images of the interior of the lumen from the point of view of the virtual camera.

13. The system of claim 9, wherein a size of the forward image can be adjusted.

14. The system of claim 9, wherein the anatomical lumen is a human organ.

15. The system of claim 14, wherein the human organ is a colon.

16. The system of claim 9, wherein the medical image data is obtained using a Computed Tomography system.

* * * * *